(12) United States Patent
Smith et al.

(10) Patent No.: US 6,960,243 B1
(45) Date of Patent: Nov. 1, 2005

(54) PRODUCTION OF DRINKING WATER FROM AIR

(75) Inventors: Douglas M. Smith, Albuquerque, NM (US); James S. Dusenbury, Novi, MI (US); William L. Warren, Stillwater, OK (US)

(73) Assignee: Nanopore, Inc., Albuquerque, NM (US)

( * ) Notice: Subject to any disclaimer, the term of this patent is extended or adjusted under 35 U.S.C. 154(b) by 101 days.

(21) Appl. No.: 10/623,188

(22) Filed: Jul. 18, 2003

Related U.S. Application Data (60) Provisional application No. 60/397,900, filed on Jul. 23, 2002.

(51) Int. Cl.$^7$ .......................... B01D 53/04; B01D 53/28
(52) U.S. Cl. .......................... 95/117; 95/126; 95/900; 95/901; 96/122; 96/128; 96/130; 96/135; 96/142; 96/144; 96/153
(58) Field of Search .......................... 95/117–120, 126, 95/900, 901; 96/121, 122, 126–128, 130, 96/135, 142, 144, 153

(56) References Cited

U.S. PATENT DOCUMENTS

| | | | | |
|---|---|---|---|---|
| 3,296,773 A | * | 1/1967 | Hemstreet | 95/154 |
| 3,400,515 A | | 9/1968 | Ackerman | 55/179 |
| 3,791,910 A | * | 2/1974 | Bowser | 428/34 |
| 4,219,341 A | | 8/1980 | Hussmann | 55/179 |
| 4,285,702 A | | 8/1981 | Michel et al. | 55/33 |
| 4,299,599 A | | 11/1981 | Takeyama et al. | 55/180 |
| 4,304,577 A | | 12/1981 | Ito et al. | 55/179 |
| 4,342,569 A | | 8/1982 | Hussmann | 55/33 |
| 4,344,778 A | | 8/1982 | Matsuoka et al. | 55/180 |
| 4,345,917 A | | 8/1982 | Hussmann | 55/33 |
| 4,365,979 A | | 12/1982 | Takeyama et al. | 55/181 |
| 4,377,398 A | | 3/1983 | Bennett | 55/208 |
| 4,661,128 A | | 4/1987 | Bachhofer et al. | 55/208 |
| 4,711,645 A | | 12/1987 | Kumar | 55/26 |
| 4,726,817 A | | 2/1988 | Roger | 55/33 |
| 5,233,843 A | | 8/1993 | Clarke | 62/271 |
| 5,281,257 A | * | 1/1994 | Harris | 95/115 |
| 5,401,706 A | * | 3/1995 | Fischer | 502/401 |
| 5,435,958 A | * | 7/1995 | Dinnage et al. | 264/171.1 |
| 5,817,167 A | | 10/1998 | DesChamps | 95/113 |
| 5,846,296 A | | 12/1998 | Krumsvik | 95/115 |
| 5,989,314 A | | 11/1999 | Schaub et al. | 95/96 |
| 6,059,860 A | * | 5/2000 | Larson | 95/117 |

(Continued)

OTHER PUBLICATIONS

Ahmed M. Hamed, "Parametric Study of the Absorption-Desorption System Producing Water from Ambient Air", International Journal of Renewable Energy Engineering, vol. 2, No. 3, Dec. 2000 (Abstract Only).

(Continued)

*Primary Examiner*—Robert H. Spitzer
(74) *Attorney, Agent, or Firm*—Marsh Fischmann & Breyfogle LLP (57) ABSTRACT

A method and apparatus for the extraction of water from a gas stream, such as atmospheric air. The method includes contacting the gas stream with a porous adsorbent material having a surface modifying agent adsorbed on the surface of a porous support. The surface modifying agent creates a hydrophilic surface for the adsorption of the water. After the water is adsorbed into the pores, the surface modifying agent is selectively desorbed from the surface. The water then evaporates from the pore and can be collected in a condenser. The method and apparatus of the present invention advantageously operate in a substantially isothermal manner, thereby reducing the size and power consumption of the device. The device can advantageously be used to extract potable drinking water from atmospheric air.

29 Claims, 5 Drawing Sheets

U.S. PATENT DOCUMENTS

| | | | |
|---|---|---|---|
| 6,156,102 A | 12/2000 | Conrad et al. ................ | 95/172 |
| 6,251,172 B1 | 6/2001 | Conrad ........................ | 96/122 |
| 6,331,351 B1 * | 12/2001 | Waters et al. ............ | 428/317.7 |
| 6,336,957 B1 | 1/2002 | Tsymerman ................ | 95/115 |
| 6,344,071 B1 * | 2/2002 | Smith et al. ................ | 95/274 |
| 6,453,684 B1 * | 9/2002 | Spletzer et al. ............... | 62/93 |
| 6,511,525 B2 | 1/2003 | Spletzer et al. ............... | 95/41 |

OTHER PUBLICATIONS

Wim J. J. Welters et al., "Fast Electrically Switchable Capillary Effects", Langnuir, 14 (7), 1538, 1998.

Markus Tuller et al., "Absorption and Capillary Condensation in Porous Media: Liquid Retention and Interfacial Configurations in Angular Pores", Water Resources Research, vol. 35, No. 7, pp. 1949-1964, Jul. 1999.

Nicholas L. Abbott et al. "Active Control of Wetting Using Applied Electrical Potentials and Self-Assembled Monolayers" Langmuir, vol. 11, No. 1, pp. 16-18, 1995.

* cited by examiner

PRODUCTION OF DRINKING WATER FROM AIR

CROSS-REFERENCE TO RELATED APPLICATIONS

This application claims priority to U.S. Provisional Patent Application Ser. No. 60/397,900, entitled "PRODUCTION OF DRINKING WATER FROM AIR," filed Jul. 23, 2002, which is incorporated herein by reference in its entirety.

STATEMENT REGARDING FEDERALLY FUNDED RESEARCH

Not applicable

BACKGROUND OF THE INVENTION

1. Field of the Invention

The present invention is in the general field of water extraction from a gas, such as air. In particular, the present invention provides a method for the extraction of potable water from air in an economical fashion, even in arid environments.

2. Description of Related Art

Obtaining sufficient quantities of drinking water on the battlefield, in disaster situations or in arid environments is a major logistical challenge. Much effort has been aimed at approaches for cleaning liquid water so that it is potable. Such approaches include filtration, distillation, adsorption, ion exchange and reverse osmosis. In general, these techniques remove one or more contaminants from the water including bacteria, viruses, chemicals, and salts. These methods all require the presence of liquid water, such as from a lake or stream.

In many environments, the presence of liquid water of any kind cannot be guaranteed. In contrast, there are always large quantities of water vapor in the air. Even in desert climates, which have high temperature and low humidity, there is a good deal of water in the air since higher temperatures increase the saturation pressure of the water vapor (i.e., the humidity may be low but the actual water partial pressure can be relatively high). Water from air also has applications far beyond the battlefield as a few statistics from the United Nations Educational, Scientific and Cultural Organization (UNESCO) illustrate:

1) Of all water, only 100,000 $km^3$ is fresh surface water, but often is in the wrong area and is polluted;
2) World water consumption in the year 2000 was 2,800 $km^3$;
3) 580,000 $km^3$ of water evaporates and rains/snows every year; and
4) There is 10,000 to 50,000 $km^3$ of water in the air and this water is more uniformly distributed around the world than any other water source.

As the world's population and per capita water consumption both continue to grow, the availability of fresh drinking water will become more of a problem, especially in arid regions.

In addition to being ubiquitous, the production of liquid water from air potentially has other advantages. For example, the water has already been purified (essentially a solar distillation process) and typically does not suffer from chemical, viral, or bacterial contamination.

The two main approaches for producing water from air have been cooling of the air to condense the water vapor and adsorption of the water vapor directly from the air. Although cooling ambient air and collecting the condensed water is a technically viable approach, the required apparatus is large, heavy and uses large amounts of energy—about 650 W-hr/liter of water depending upon the particular design and the relative humidity of the ambient air. The fundamental problem with cooling air to condense the water vapor is the low concentration of water in the air. Water vapor constitutes only about 1% of the volume of air depending upon the air temperature and humidity. When the vapor is condensed to liquid, it undergoes another volume reduction of about 1000×. Therefore, the production of a liter of liquid water requires the cooling of about 100,000 liters of air.

Adsorption concentrators solve this concentration problem. Although all systems that extract water from air must process large quantities of air to access sufficient water vapor, it is desirable to process the air isothermally and isobarically to reduce overall energy costs, as is the case with an adsorption-based system.

The major problem with current adsorption-based systems is the heat that is generated by the adsorption process and the requirement to regenerate the adsorber by removing water. The most common way to regenerate adsorbents is by thermal swing, i.e., heating the adsorbent to remove water. However, thermal swing requires large temperature changes, precludes rapid cycling and uses a good deal of energy.

U.S. Pat. No. 6,336,957 by Tsymerman discloses an adsorption-based apparatus where thermal swing is used to desorb water from the sorbent material to collect water from air. Ambient air is drawn into a first area of an enclosure which comprises the sorbent material. A second area of the enclosure contains a condenser. After the sorbent material is saturated with water, the first area is hermetically sealed and the sorbent is then heated to cause desorption of the water from the sorbent. A pressure differential is then created between the first area and the second area, whereby water-containing air flows from the first area to the second area and the water is condensed and collected.

U.S. Pat. No. 5,817,167 by DesChamps discloses an adsorption-based apparatus to dehumidify air. The adsorption system comprises at least one heat pipe with desiccant materials applied to the first end of the pipe. During the sorption phase, ambient air is fed through the pipe containing the desiccant and water is adsorbed by the desiccant. The generated heat is transferred from the desiccant to the first end of the pipe, then to the second end of the pipe and finally to a second air stream, thereby maintaining an adiabatic sorption process. During the desorption phase, a heated air stream contacts the second end of the pipe which transfers the heat from the heated air stream to the second end of the pipe and, ultimately, to the desiccant material. The increase in the temperature of the desiccant evaporates water from the surface of the desiccant.

An alternative method to regenerate an adsorbent is pressure swing, i.e., removing water by reducing the pressure over the adsorbent. In this method, the adsorber is connected to a vacuum system that extracts water from the adsorbent and feeds the water vapor to a refrigerated heat exchanger.

U.S. Pat. No. 6,156,102 by Conrad et al. discloses an absorption based apparatus using a pressure and/or thermal swing to collect water from air. A hygroscopic solution is contacted with air wherein the water in the air is absorbed by the hygroscopic solution. The hygroscopic solution and air are separated and the solution is exposed to a temperature swing, pressure swing, or both to release the water from the hygroscopic solution. The use of a membrane to separate water from the hygroscopic solution is also disclosed.

With the use of pressure swing recovery, condensation of the water vapor occurs in the refrigerated heat exchanger and the heat of vaporization is the only load on the refrigerated heat exchanger (i.e., cooling of large volumes of air is not required). With a COP (coefficient of performance) of 2, the overall energy consumption can be reduced to about 350 W-hr/liter of water. However, an energy consumption of about 350 W-hr/liter of water is still over an order of magnitude above the energy required for the production of fresh water using distillation or reverse osmosis of seawater. Therefore, there is a need for a new means of producing potable water from air using a much lower quantity of energy per unit of water extracted. The amount of energy used for a blower to provide sufficient airflow to produce a liter of liquid water from 50% relative humidity air is only about 5 W-hr/liter of water. Thus, if a low energy approach can be used to extract the liquid from the adsorbent, the total energy requirement to extract liquid water from air could approach that of reverse osmosis cleanup of water or be even lower.

U.S. Pat. No. 6,453,684 by Spletzer et al. discloses a method for extracting water from air using non-adiabatic compression. Air is compressed using a piston to a relative humidity of about 1. A temperature gradient is maintained within the piston and water condenses in the cooler region. This condensate is then removed and the remaining air is discharged to the atmosphere. Heat may be removed during the compression step and then added to the expanded, dry gas prior to its release. Spletzer et al. disclose work of 1.3 MJ per kilogram of water extracted at a temperature of 25° C. and a humidity of 40%.

In addition to power consumption, the weight and volume of adsorption-based apparatus are typically too large to consider the system for portable use. Most of the weight and volume are associated with the vapor condensation/refrigeration portion of the apparatus. If the refrigeration/condensation step and the related device can be eliminated, a significant size reduction could be achieved. For the volume of water per weight of the device, current condensation systems achieve about 0.001 liter/hour/kg (e.g., a one kilogram device will process about 1 milliliter of water per hour). Advanced refrigeration/adsorption systems under development could yield 0.002 to 0.005 liter/hr/kg. However, with an improved water recovery system, the system mass could decrease to yield a system rate of 0.2 liter/hr/kg.

SUMMARY OF THE INVENTION

The present invention provides a method for the extraction of water from a gas stream, such as atmospheric air. The method includes the step of contacting the gas stream with a porous adsorbent that comprises a surface modifying agent adsorbed onto a porous support, whereby water from the gas stream is adsorbed into the pores of the porous adsorbent and a dried gas stream is formed. The surface modifying agent is then desorbed from the porous support and liquid water evaporates from the pores to form water vapor. The water vapor can then be recovered as a liquid, such as in a condenser.

According to another embodiment of the present invention, an apparatus for extracting water from a gas stream is provided. The apparatus includes a porous adsorbent material that comprises a surface modifying agent adsorbed onto a porous support structure and means for supplying a gas stream to the adsorbent material, such as a fan, to provide a gas stream flow to the adsorbent. Desorbing means are provided for desorbing the surface modifying agent from the porous support structure thereby releasing water vapor. A condenser is in gaseous communication with the adsorbent material for extracting the water vapor as a liquid. The desorbing means can include means for applying an electrical current to the porous adsorbent material to generate localized heat and desorb the surface modifying agent.

DESCRIPTION OF THE INVENTION

According to the present invention, water is adsorbed from a gas, such as ambient air, in a concentrator that includes an adsorbent material. As used herein, terms such as adsorbed and adsorption refer to a mechanism wherein one substance is attracted to and held onto the surface of another. The liquid-like water that is adsorbed in the pores of the adsorbent material is removed by initiating a surface modification of the adsorbent surface. Preferably, a reversible surface modification is utilized such that the internal pore surfaces of the adsorbent material can be cycled between a hydrophilic state (wetting) and a hydrophobic state (non-wetting). In the hydrophilic state, the adsorbent will adsorb water from the gas that is brought into contact with the adsorbent. When the internal pores of the adsorbent are switched to a hydrophobic state, the meniscus shape of the liquid within the pores changes and the adsorbed water can be removed from the adsorbent and collected. Thus, the water can be extracted substantially isothermally and without the use of refrigeration.

At least two methods can be used to remove (desorb) the water from the adsorbent according to the present invention. In a first method, the adsorbent is initially in a hydrophilic state so that the pores fill with water from the gas stream. After the pores are filled, the surface chemistry of the pores is altered so that the surface changes from a hydrophilic state to hydrophobic state and the water is expelled from the pores as a liquid. One disadvantage of this approach is that there is no mechanism for rejecting the heat of adsorption to the air and the temperature of the adsorbent would rapidly increase during cycling, thereby decreasing the capacity of the adsorbent.

A second and more preferred method according to the present invention is to utilize a change in the vapor pressure of water above the adsorbent that arises due to a change in the contact angle/meniscus shape between the water and the pore surface to drive the extracted water from the adsorbent. This eliminates problems associated with the heat of adsorption discussed above since the water is extracted from the adsorbent as a vapor. Advantageously, the dried air exiting the concentrator can be passed through a condenser including a heat exchanger where water vapor condenses and the generated heat is transferred to the dried air. This enables the system to operate without commonly used downstream devices that consume large quantities of energy, such as a vacuum and a refrigeration/condensation unit.

Figure 1:
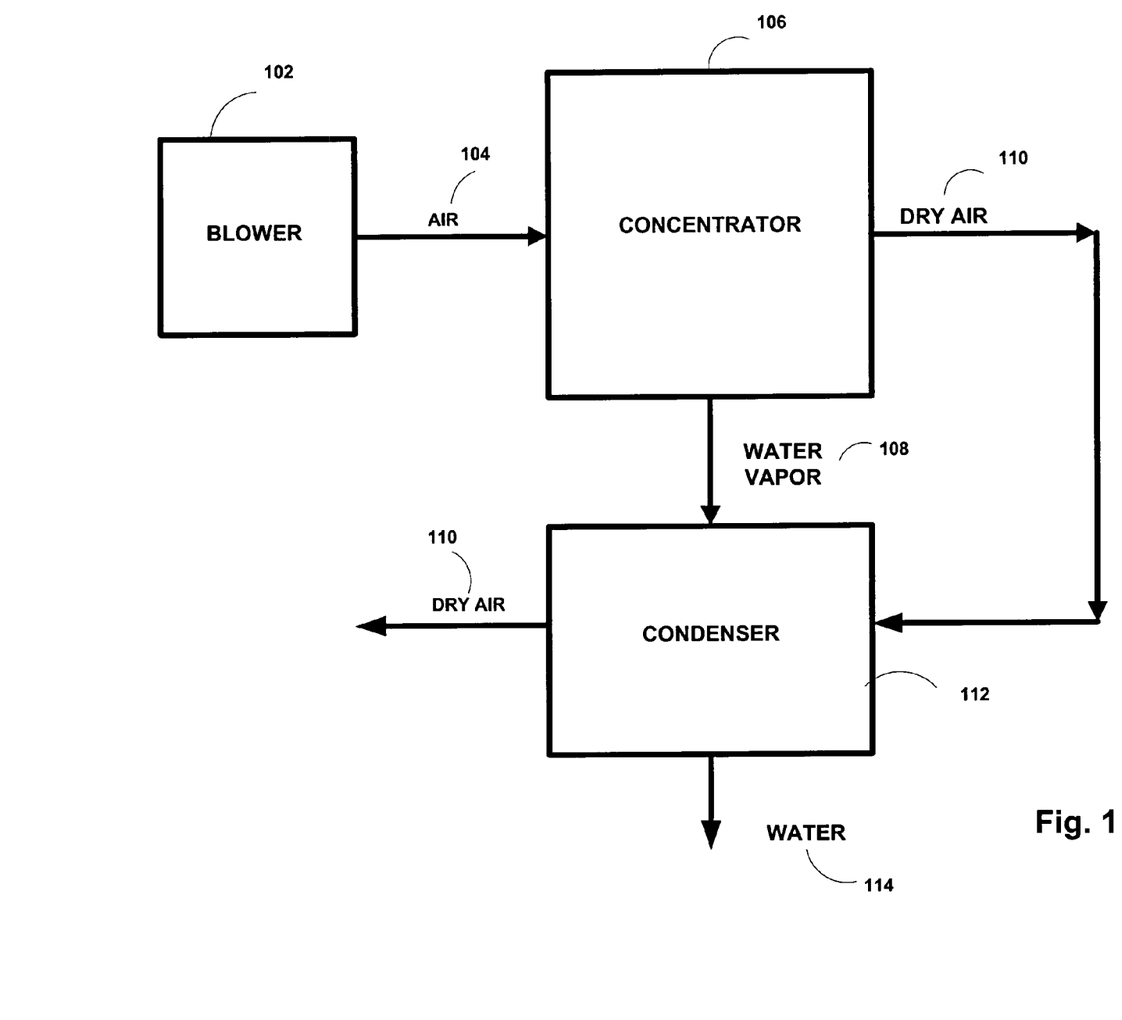
FIG. 1 is a flowsheet schematically illustrating a device for the extraction of water from an ambient gas according to the present invention.

A schematic illustration of a process flow according to this embodiment of the present invention is illustrated in FIG. 1. A blower 102 (e.g., a fan) provides a flow of air 104 to a concentrator 106. The concentrator 106 includes an adsorbent material wherein the adsorbent can be cycled between a hydrophilic state and a hydrophobic state. Initially, the adsorbent is in the hydrophilic state such that the adsorbent removes water vapor from the air 104 and forms a dry air stream 110. The adsorbent material can be attached to a rigid support using a binder to form a sheet and multiple sheets can be stacked in the concentrator 106.

The adsorbent material utilized in the concentrator 106, is selected such that the contact angle between the adsorbent surface and the water can be controlled. Thus, the adsorbent disposed in the concentrator advantageously has the ability to selectively adsorb and desorb water from the internal pores of the adsorbent material.

Figure 2:
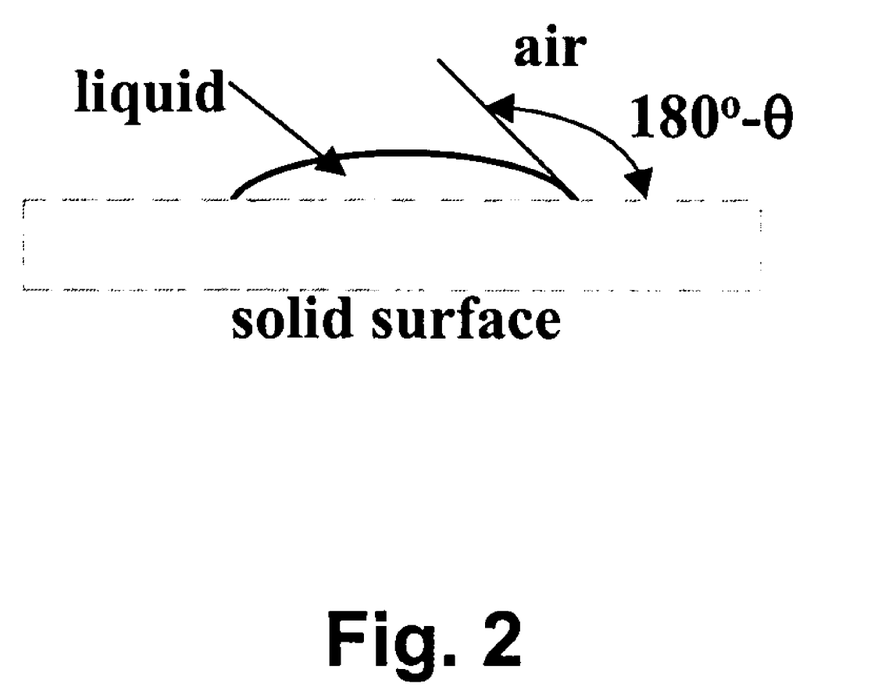
FIG. 2 illustrates the contact angle (O) between a liquid and a solid surface.

The contact angle ($\theta$) that a liquid drop makes on a solid surface is a function of the liquid and the surface chemistry. FIG. 2 illustrates a liquid on a solid surface wherein the contact angle is about 60° and therefore is in a wetting state ($\theta < 90°$). For a polar fluid like water, contact with a polar surface will yield a hydrophilic state (wetting) and contact with a non-polar surface such as carbon or polytetrafluoroethylene (PTFE, e.g., TEFLON) will yield a hydrophobic state (non-wetting).

Figure 3:
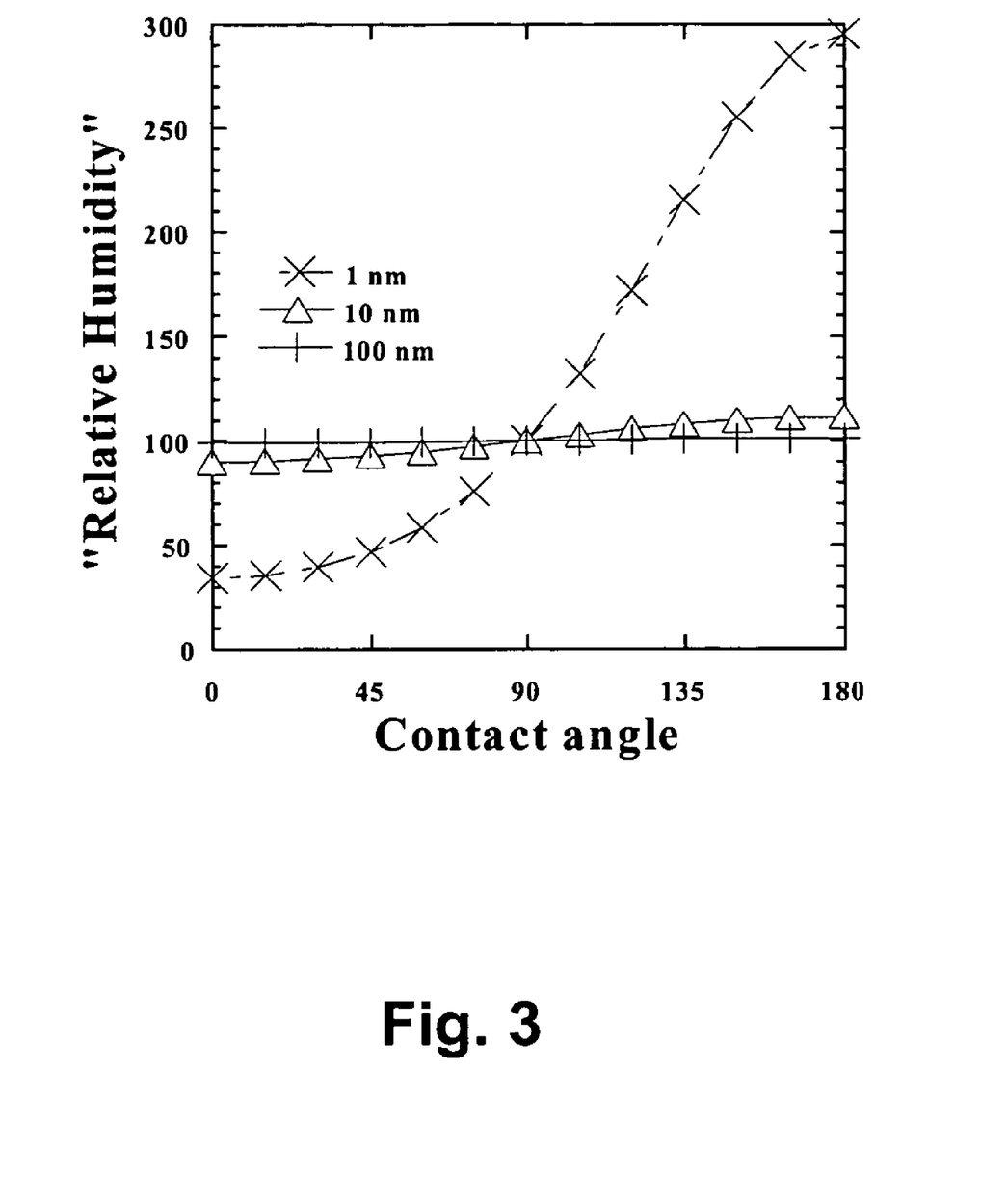
FIG. 3 illustrates relative humidity as a function of contact angle for adsorbents having three different pore sizes.
Figure 4:
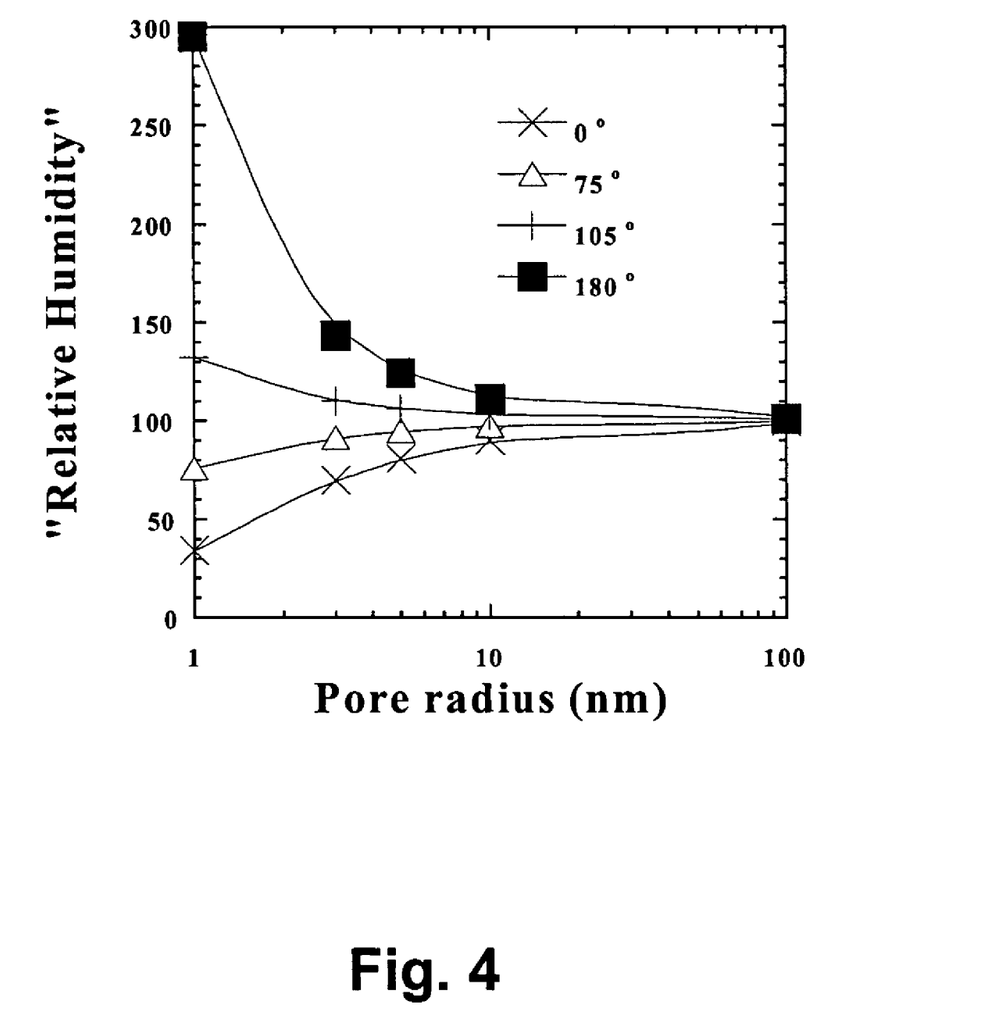
FIG. 4 illustrates the relative humidity as a function of adsorbent pore size for different contact angles between the liquid and the adsorbent surface.

When liquid is in a pore, the vapor pressure of the liquid depends upon the contact angle and the pore size and is described by the Kelvin equation. FIGS. 3 and 4 show the equilibrium relative humidity (which is directly proportional to vapor pressure) of water in pores of different radii and contact angle. Referring to FIG. 3, if the pore radius is 1 nm, changing the contact angle from 0° to 180° will produce a ten-fold increase in the vapor pressure. Even a relatively small change of 30° around a contact angle of 90° (i.e., from 75° to 105°) will yield a large (2×) change in vapor pressure. Thus, if water is adsorbed when the surface is in a hydrophilic state, the pores will fill with the water. When the surface is switched to a hydrophobic state and the vapor pressure increases, the water will desorb as water vapor and can be collected.

From the data illustrated in FIG. 3, it is clear that this effect must be undertaken in a porous substrate with relatively small pores to be effective. Preferably, the adsorbent material includes a porous support structure that has an average pore size (diameter) of at least about 1 nanometer and not greater than about 50 nanometers, such as from about 2 nanometers to about 10 nanometers. Examples of materials that can be fabricated into structures having such properties include various types of carbon, metal oxides such as silica and various polymers. Preferred support structure materials according to the present invention include activated carbon and silica, such as surface-modified silica. The surface of the silica can be modified to change the hydrophilic silica surface to a hydrophobic surface. This can be accomplished by applying an organic compound, such as one including alkyl (e.g., methyl and ethyl), phenyl and/or fluoroalkyl groups to modify the surface of the silica.

Various approaches can be employed to change the contact angle between the porous support and the water. Examples include: 1) electrochemical oxidation/redox of self-assembled monolayers (SAMs) on the porous support; 2) photochemical reactions of reactive groups on monolayers adsorbed on the porous support; and 3) thermal desorption of species adsorbed on the porous support by localized electrical resistance heating.

One approach to change the contact angle on the pore surface according to the present invention is to use a surface-modifying agent to change the surface chemistry of the porous support and from an adsorbent material. For example, an adsorbed, low volatility surfactant can be used as a surface modifying agent to change the surface chemistry. As an example, the surface chemistry of carbon that has not been oxidized is normally quite hydrophobic (e.g., $\theta > 120°$). However, if a molecule is pre-adsorbed on the carbon surface that has different functionality (hydrophobic and hydrophilic) at two locations on the molecule, the surface chemistry can be modified. When this molecule is adsorbed on the carbon, it will provide a polar nature to the surface and form a wetting (hydrophilic) surface. When the surface modifying agent is desorbed into the pore after the pore has filled with water, the pore surface will form a contact angle similar to the carbon (e.g., $\theta > 120°$) and the liquid water will evaporate to form water vapor. The surface modifying agent, due to a low vapor pressure, does not evaporate from the pore and will re-adsorb onto the pore surface.

Thus, the surface-modifying agent should:
1) Have a low volatility as compared to water;
2) Have a relatively small molecule size as compared to the pore size of the porous substrate;
3) Not bind too strongly to the carbon; and
4) Water must not bind too strongly to the molecule.

One family of compounds that can be utilized as a surface modifying agent according to the present invention is the family of polyethylene glycols (PEG), any of several condensation polymers of ethylene glycol with the general formula $HOCH_2(CH_2OCH_2)_nCH_2OH$ or $H(OCH_2CH_2)_nOH$. Another family of compounds that can be utilized as the surface modifying agent is the family of polypropylene glycols (PPG), any of several condensation polymers of propylene glycol with the general formula $HOCH_2(CH_2OCH_2CH_2)_nCH_2OH$ or $H(OCH_2CH_2CH_2)_nOH$. The foregoing compounds are available in a wide range of molecular weights and with different surface functionality. The molecular oxygen linkages provide a large number of sites for hydrogen bonding to water but do not have too high an adsorption binding energy to either the carbon or the water. Examples of the foregoing compounds include poly(propylene glycol) mono butyl ether, tri(propylene glycol) butyl ether and polyethylenimine.

The surface modifying agent can be applied to the porous support to form the adsorbent material by virtually any method known to those skilled in the art. For example, the surface modifying agent can be dissolved in a solvent and the solution can be wicked into the support structure. Thereafter, the solvent can be removed by drying, leaving the surface modifying agent adsorbed onto the porous support structure to form the adsorbent. Suitable solvents can include alcohols, such as isopropanol.

Desorption of the surface modifying agent from the surface of the porous support can be achieved using electrical resistance heating. For electrical resistance heating, a current is passed through the adsorbent material and localized heating occurs at the interface of the porous support (e.g., carbon) and the surface modifying agent (e.g., PEG). If the interactions between carbon, PEG and water are correctly balanced, a large local temperature rise is not required for desorption. Accordingly, the temperature rise required for desorption could be 10° C. or less. When activated carbon is used as the support material, the relatively low thermal conductivity of the activated carbon will enable the creation of localized heating.

Several groups have also demonstrated changes in the contact angle of water on a flat surface using oxidation and redox reactions of self-assembled monolayers (SAM). As an example, it has been shown that the contact angle changes from 0° to 110° with cycle times on the order of seconds (Langmuir, 1995, 11, 16). However, for use in the production of water from ambient air, this technology must be implemented in a porous cell as compared to a flat surface.

According to one embodiment of the present invention, the components of a SAM are pre-adsorbed into the pores of a porous support, such as conductive carbon. In that state, the system is hydrophilic. When the pores fill, a circuit is completed and the surface is made hydrophobic. Again, because the work of the electrical potential is to change only the nature of a relatively small number of surface groups, the overall electrical consumption will be low. Compounds useful for forming SAMs include the surface modifying agents described above, applied in very low concentrations to form a monolayer.

Figure 5:
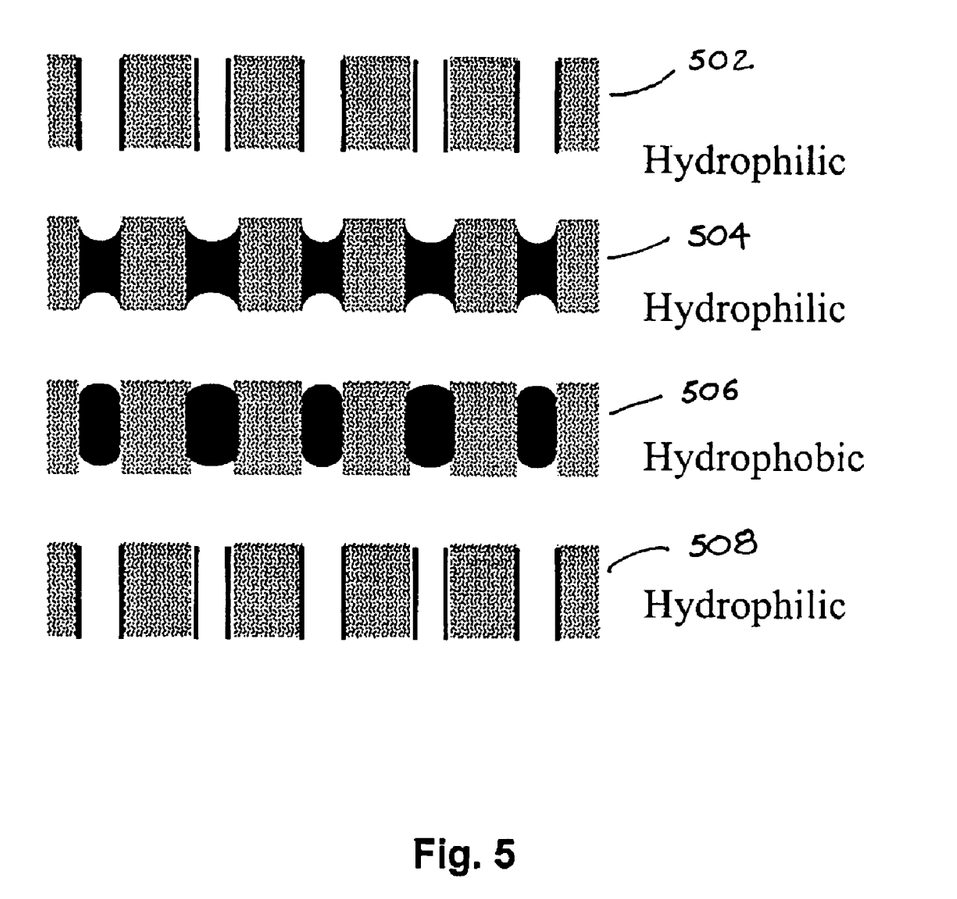
FIG. 5 illustrates the effect of changing the nature of the adsorbent surface on the liquid contained in the adsorbent pores according to the present invention.

The interaction between the adsorbent and water in the concentrator according to a preferred embodiment of the present invention is illustrated in FIG. 5. The pores illustrated in FIG. 5 have a pore diameter of about 2 nanometers. Initially, the surface chemistry is in the hydrophilic state 502 and the pores fill with water as a gas that contains water vapor is contacted with the adsorbent. Note the curvature of the vapor-liquid meniscus in the hydrophilic state 504 resulting from a contact angle of less than 90° with the adsorbent surface. When the surface chemistry is changed to hydrophobic 506, the meniscus curvature changes which yields a substantial increase in the vapor pressure (see FIG. 3) and water evaporates out of the pores, again leaving a hydrophilic surface 508. By rapidly cycling using this isothermal adsorption system, the temperature of the adsorbent will remain substantially constant.

Referring back to FIG. 1, the relatively high vapor pressure (supersaturated) water vapor 108 that is released from the pores of the adsorbent can be condensed in an air-cooled condenser 112, where the heat is rejected to the ambient air. Alternatively, the liquid can be expelled from the pores and in that case, heat must be rejected from the adsorbent to ambient air.

The flow of air 104 is continued until the adsorbent is saturated or nearly saturated with water. Thereafter, the flow of air 104 is terminated and the adsorbent is switched to a hydrophobic state, as is discussed above. When the adsorbent is switched to a hydrophobic state, water vapor 108 is released from the adsorbent. Dry air 110 from the concentrator 106 is circulated to a condenser 112 where the water vapor 108 condenses and the heat is transferred to the dry air 110. Water 114 is then extracted from the condenser.

Although only one water extraction unit is illustrated in FIG. 1, it will be appreciated that multiple units can be connected to maximize the extraction of water from air. For example, a single blower can be disposed to pass air through a first condenser until the adsorbent in the first condenser is saturated. At that point, the blower can be switched to a second condensor, whereupon the water in the first concentrator is desorbed by initiating a change in the surface chemistry of the adsorbent in the first concentrator. The dry air exiting the second concentrator can then be directed to a condensation unit that receives water from the first concentrator to cool and condense the water vapor. In this manner, water can be continually extracted from the ambient air.

The present invention provides an improved method and apparatus for the extraction of water from a gas stream, such as ambient air. The method and apparatus is particularly useful for the extraction of high purity (potable) water from the atmosphere. The apparatus is small and portable and consumes very low amounts of energy per unit of water extracted.

EXAMPLES

The following Examples illustrate various embodiments in accordance with the present invention.

Example 1

Partially hydrophobic activated carbon particles having a high surface area (SA-1500, MeadWestvaco Corporation, Stamford, Conn.) are attached to opposing sides of a 316 grade stainless steel sheet (10 cm×15 cm×250 µm) using a phenolic binder (Resin 12874, Rutgers-Plenco LLC, Sheboygan, Wis.) that is previously combined with carbon black (XC-72, Cabot Corporation, Boston, Mass.) to make the binder electrically conductive. To attach the activated carbon particles to the stainless steel sheet, the binder is applied to the sheet by dip coating and the particles are adhered to the coated sheet. The sheet and binder are then thermally cured at 150° C. for one minute.

Next, the internal pores of the hydrophobic activated carbon particles are coated with a mixture of water and a surfactant, namely poly(propylene glycol) mono butyl ether having the general formula $CH_3(CH_2)_3[OCH_2CH(CH_3)]_n OH$ and a molecular weight of 1,000 (CAS #9003-13-8, Aldrich #43,811-1, Sigma-Aldrich, Co., St. Louis, Mo.). The ratio of poly(propylene glycol) mono butyl ether to activated carbon is 1:10 by mass. The sheet and water-glycol solution is then dried at 110° C.

Example 2

Partially hydrophobic activated carbon particles having a high surface area (WVA-1500, MeadWestvaco Corporation) are attached to opposing sides of a 316 grade stainless steel sheet (10 cm×15 cm×250 µm) using a phenolic binder (Resin 12874, Rutgers-Plenco LLC) previously combined with carbon black (XC-72, Cabot Corporation) to make the binder electrically conductive. To attach the activated carbon particles to the stainless sheet, the binder is applied to the sheet by dip coating and the particles are adhered to the coated sheet. The sheet and binder are then thermally cured at 150° C. for one minute.

Next, the internal pores of the hydrophobic activated carbon particles are coated with water and a surfactant, namely tri(propylene glycol) butyl ether having the general formula $C_4H_9O[CH_2 CH(CH_3)O]_3H$ and a molecular weight of 248.4 (CAS #55934-93-5, Aldrich #48,422-9). The ratio of tri(propylene glycol) butyl ether to activated carbon is 1:10 by mass. The sheet and water-glycol solution is then dried at 110° C.

Example 3

Partially hydrophobic activated carbon particles having a high surface area (SA-1500, MeadWestvaco Corporation) are mixed with a microfine, low-density thermoplastic binder (Microthene FN 510-00, Equistar Chemicals LP, Houston, Tex.) at a mass ratio of 4:1, respectively. The mixture is applied to opposing sides of a 316 grade stainless steel sheet (10 cm×15 cm×250 μm) The sheet and binder are thermally cured at 110° C. for five minutes.

Next, the internal pores of the hydrophobic carbon particles are coated with water and a surfactant, namely poly (propylene glycol) mono butyl ether having a molecular weight of 1,000 (CAS #9003-13-8, Aldrich #43,811-1). The ratio of poly(propylene glycol) mono butyl ether to activated carbon is 1:5 by mass. The sheet and water-glycol solution is then dried at 110° C.

Example 4

Very hydrophobic activated carbon particles having a high surface area (RGC-MeadWestvaco Corporation) are attached to opposing sides of a 316 grade stainless steel sheet (10 cm×15 cm×250 μm) using a phenolic binder (Resin 12874, Rutgers- Plenco LLC) previously combined with carbon black (XC-72, Cabot Corporation) to make the binder electrically conductive. To attach the activated carbon particles to the stainless steel sheet, the binder is applied to the sheet by dip coating and the particles are adhered to the coated sheet. The sheet and binder are then thermally cured at 150° C. for one minute.

Next, the internal pores of the hydrophobic carbon particles are coated with water and a surfactant, namely poly (propylene glycol) mono butyl ether having a molecular weight of 550 (CAS #9004-74-4, Aldrich #20,248-7). The ratio of poly(propylene glycol) mono butyl ether to activated carbon is 1:10 by mass. The sheet and water-glycol solution is then dried at 110° C.

Example 5

Very hydrophobic activated carbon particles having a high surface area (RGC-MeadWestvaco Corporation) are attached to opposing sides of a 316 grade stainless steel sheet (10 cm×15 cm×250 μm) using a phenolic binder (Resin 12874, Rutgers-Plenco LLC). To attach the activated carbon particles to the stainless steel sheet, the binder is applied to the sheet by dip coating and the particles are adhered to the coated sheet. The sheet and binder are then thermally cured at 150° C. for one minute.

Next, the internal pores of the hydrophobic carbon particles are coated with a surfactant, namely polyethylenimine having the general formula $(NHCH_2CH_2)_x[N(CH_2CH_2NH_2)CH_2CH_2-]_y$, and a molecular weight of 800 (CAS #25987-06-8, Aldrich #40,871-9). The ratio of polyethylenimine to activated carbon is 1:20 by mass. The sheet and polyethylenimine solution is then dried at 110° C.

Construction and Application of Device

For each of the sheets illustrated in Examples 1–5, above, after the surfactant has been combined with the hydrophobic activated carbon particles and dried, multiple sheets are stacked together using plastic spacers (DELNET, DelStar Technologies, Middletown, Del.) such that a 1 mm gap exists between the sheets. Humid air is passed over the sheets to achieve physical communication between the humid air and pores of the activated carbon. Humid air is supplied until the pores of the activated carbon are saturated with water. A 120 V, 60 Hz current is then applied to the sheets and the surfactant is desorbed, thereby changing the pore surface of the activated carbon from hydrophilic to hydrophobic. Alternatively, a direct current (DC) power supply may be employed. In either AC or DC cases, the production of hydrogen via electrolysis of water should be minimized since that consumes large amounts of electricity.

The DC field, typically several volts, may be used to induce the formation of a self-assembled monolayer. As an alternative to electrical fields, photo stimulation may be used to desorb the surfactant by using a white or UV lamp. An increased water vapor pressure over the pores is thus created and the water vapor desorbs from the activated carbon for subsequent collection in a condenser.

While various embodiments of the present invention have been described in detail, it is apparent that modifications and adaptations of those embodiments will occur to those skilled in the art. However, it is to be expressly understood that such modifications and adaptations are within the spirit and scope of the present invention.

What is claimed is:

1. A method for the extraction of water from a gas stream, comprising the steps of:
   a) contacting a gas stream comprising water with a porous adsorbent, said porous adsorbent comprising a surface modifying agent adsorbed onto a porous support whereby water is adsorbed into pores of said porous adsorbent to form a dried gas stream;
   b) desorbing said surface modifying agent from said porous support, wherein liquid water evaporates from said pores upon desorption of said surface modifying agent and forms water vapor; and
   c) recovering said water vapor.

2. A method as recited in claim 1, wherein said gas stream consists essentially of atmospheric air.

3. A method as recited in claim 1, wherein said step of contacting a gas stream comprises forcibly moving said gas stream over said adsorbent.

4. A method as recited in claim 1, wherein said step of recovering water vapor comprises condensing said water vapor.

5. A method as recited in claim 4, further comprising the step of supplying said dried gas stream to a condenser including a heat exchanger to absorb heat generated by said condensing step.

6. A method as recited in claim 1, wherein said pores have an average pore diameter of from about 1 nanometer to about 50 nanometers.

7. A method as recited in claim 1, wherein said pores have an average pore diameter of from about 2 nanometers to about 10 nanometers.

8. A method as recited in claim 1, wherein said surface modifying agent is a surfactant.

9. A method as recited in claim 1, wherein said surface modifying agent is selected from the group consisting of polymers of ethylene glycol and polymers of propylene glycol.

10. A method as recited in claim 9, wherein said surfactant is selected from the group consisting of polyethylene glycol, polyethylenimine, poly(propylene glycol) mono butyl ether, tri(propylene glycol) butyl ether, and combinations thereof.

11. A method as recited in claim 1, wherein said surface modifying agent comprises a self-assembled monolayer.

12. A method as recited in claim 1, wherein said porous support is selected from the group consisting of carbon, metal oxides, polymers and combinations thereof.

13. A method as recited in claim 1 wherein said porous support comprises activated carbon.

14. A method as recited in claim 1, wherein said porous support comprises surface-modified silica.

15. A method as recited in claim 1, wherein said desorbing step comprises thermally desorbing said surface modifying agent.

16. A method as recited in claim 15, wherein said desorbing step comprises applying a voltage to said porous adsorbent to generate localized heat.

17. A method as recited in claim 1, wherein the contact angle between said liquid water and said adsorbent before said desorption step is not greater than about 90°.

18. A method as recited in claim 1, wherein the contact angle between said liquid water and said adsorbent after said desorbing step is at least about 120°.

19. An apparatus for extracting water from a gas stream, comprising:
   a) a porous adsorbent material, said porous adsorbent material comprising a surface modifying agent adsorbed onto a porous support structure;
   b) a gas supply means for supplying a gas stream comprising water to said porous adsorbent material;
   c) desorbing means for desorbing said surface modifying agent from said porous support structure; and
   d) a condenser in gaseous communication with said porous adsorbent material and adapted to extract water vapor released from said porous adsorbent material.

20. An apparatus as recited in claim 19, wherein said gas supply means comprises a fan.

21. An apparatus as recited in claim 19, wherein said desorbing means comprises an electrical source adapted to apply a current to said porous adsorbent material and generate localized heat in said porous adsorbent material.

22. An apparatus as recited in claim 19, wherein said porous support structure comprises pores having an average pore diameter of from about 1 nm to about 50 nm.

23. An apparatus as recited in claim 19, wherein said porous support structure comprises pores having an average pore diameter from about 2 nm to about 10 nm.

24. An apparatus as recited in claim 19, wherein said porous support structure is selected from the group consisting of carbon, metal oxides, polymers and combinations thereof.

25. An apparatus as recited in claim 19, wherein said porous support structure comprises activated carbon.

26. An apparatus as recited in claim 19, wherein said porous support structure comprises surface-modified silica.

27. An apparatus as recited in claim 19, wherein said surface modifying agent is a surfactant.

28. An apparatus as recited in claim 19, wherein said surface modifying agent is selected from the group consisting of polymers of ethylene glycol and polymers of propylene glycol.

29. An apparatus as recited in claim 19, wherein surface modifying agent comprises a self-assembled monolayer.

\* \* \* \* \*